UNITED STATES PATENT OFFICE.

HAMILTON YOUNG CASTNER, OF LONDON, ENGLAND.

BLEACHING COMPOUND.

SPECIFICATION forming part of Letters Patent No. 486,188, dated November 15, 1892.

Application filed August 3, 1892. Serial No. 442,059. (No specimens.)

*To all whom it may concern:*

Be it known that I, HAMILTON YOUNG CASTNER, a citizen of the United States, residing at 115 Cannon Street, in the city of London, England, have invented a certain new and useful Improved Bleaching Compound; and I do hereby declare that the following is a full, clear, and exact description of the invention, which will enable others skilled in the art to which it appertains to make and use the same.

While it is generally considered that hydrogen peroxide is a very superior bleaching agent, there are certain disadvantages to its general employment: first, its high cost compared with other bleaching agents; second, the difficulty and cost of transportation, the latter being quite evident when it is considered that the ordinary solutions (viz., ten volumes) only contain one and four-tenths per cent. of available oxygen; third, the solutions gradually decompose and lose their bleaching power, owing to the loss of oxygen; fourth, it is a well-known point that while hydrogen-peroxide solutions must always have an acid reaction which will retard decomposition in keeping, still the solution used in bleaching must be made alkaline. Thus to prepare ordinary bleaching-baths of hydrogen peroxide requires a certain amount of chemical knowledge and the frequent testing of the hydrogen-peroxide solutions employed to ascertain its gradually-decreasing strength. The preparation of hydrogen peroxide of good quality from barium peroxide is a matter of some difficulty, and although it is much simpler to prepare it from sodium peroxide where that material is obtainable, still it requires some care, owing to the heat evolved on solution, and in addition care must be employed in handling the pure sodium peroxide, owing to the high percentage of oxygen.

This invention consists of a new bleaching compound prepared in a dry state and which when simply added to water will without other additions produce a bleaching-bath ready for immediate use in either a hot or cold condition and adapted for bleaching any materials now bleached by the use of hydrogen peroxide.

According to my invention the requisite oxygen for the bleaching-bath is introduced in the form of sodium peroxide, a material which, although long known, has only lately been commercially manufactured under a process invented by me. Chemists will, however, know that if sodium peroxide be added to acid solutions the result will be the formation of hydrogen peroxide and a neutral salt formed by the combination of the acid with the alkali. They will also know that if certain substances—say magnesia—be added to hydrogen peroxide the bleaching power will be increased and the baths or solutions may be employed in a warm condition, which will tend to further accelerate the process.

In preparing what I call "soda-bleach" sodium peroxide is mixed with an equivalent proportion of a neutral anhydrous salt—such, for example, as magnesic sulphate or chloride— or instead of a single salt a mixture may be used—as, for example, magnesium chloride and calcium chloride. The soda-bleach mixture when made in equivalent proportions contains a large proportion of oxygen and in closed packages is quite stable. In preparing this mixture a slight excess of peroxide may be used, so that when a bleaching-bath is made by solution it will have an alkaline reaction due to the free alkali. With this material so compounded it is only necessary to dissolve in water to form hydrogen-peroxide solutions for immediate use, the reaction taking place on treating with water being as follows:

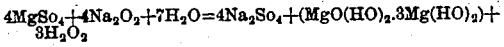

or with calcium the formula would be

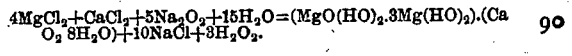

Thus owing to the presence of the alkaline earth metal a certain quantity of the peroxide hydrate is precipitated, which is far more stable when heated than is hydrogen peroxide, and for materials that naturally are in a degree more difficult to bleach the quantity of peroxide hydrate precipitated is increased by increasing the relative proportion of the calcium salt to the magnesium salt. From the former a pure peroxide hydrate is precipitated instead of a mixed hydrate and peroxide hydrate, as when magnesia alone is used. Soda-bleach thus made contains at least seven and one-half per cent. of available oxygen, or almost six times the quantity contained in ten-volume hydrogen peroxide; it is a dry powder which can be packed in tin-lined canisters; it does not lose oxygen in keeping, and it is ready to form alkaline solutions of pure hydrogen peroxide containing hydrated peroxide of the alkaline earths by merely adding water. Such solutions may also be used warm, whereby the bleaching action is very rapid and thorough.

What I claim is—

The new bleaching compound composed of sodium peroxide and one or more neutral salts of the alkaline-earth metals, substantially as described.

In testimony whereof I have hereunto set my hand in the presence of two subscribing witnesses.

HAMILTON YOUNG CASTNER.

Witnesses:
WALTER J. SKERTEN,
T. T. OSMAN,
*Both of No. 17 Gracechurch Street, London, E. C.*